US008010895B2

(12) United States Patent
Chen

(10) Patent No.: US 8,010,895 B2
(45) Date of Patent: Aug. 30, 2011

(54) METHOD FOR CORRECTING TYPING ERRORS ACCORDING TO CHARACTER LAYOUT POSITIONS ON A KEYBOARD

(75) Inventor: Stephen Chen, Changhua (TW)

(73) Assignee: E-Lead Electronic Co., Ltd., Changhua (TW)

( * ) Notice: Subject to any disclaimer, the term of this patent is extended or adjusted under 35 U.S.C. 154(b) by 0 days.

(21) Appl. No.: 11/976,447

(22) Filed: Oct. 24, 2007

(65) Prior Publication Data
US 2010/0253636 A1  Oct. 7, 2010

(51) Int. Cl.
*G06F 17/00* (2006.01)
(52) U.S. Cl. ...................................... 715/271
(58) Field of Classification Search .............. 715/200, 715/271
See application file for complete search history.

(56) References Cited

U.S. PATENT DOCUMENTS

| | | | | |
|---|---|---|---|---|
| 4,648,731 | A * | 3/1987 | Iwai et al. | 400/240.1 |
| 6,009,444 | A * | 12/1999 | Chen | 715/263 |
| 6,616,703 | B1 * | 9/2003 | Nakagawa | 715/201 |
| 6,708,150 | B1 * | 3/2004 | Hirayama et al. | 704/243 |
| 7,761,295 | B2 * | 7/2010 | Bennett et al. | 704/235 |
| 2002/0120905 | A1 * | 8/2002 | Blaum et al. | 714/800 |
| 2002/0149567 | A1 * | 10/2002 | Griffin et al. | 345/169 |
| 2003/0014450 | A1 * | 1/2003 | Hoffman | 707/533 |
| 2003/0212961 | A1 * | 11/2003 | Soin et al. | 715/530 |
| 2004/0036679 | A1 * | 2/2004 | Emerson | 345/168 |
| 2004/0046744 | A1 * | 3/2004 | Rafii et al. | 345/168 |
| 2006/0028358 | A1 * | 2/2006 | Bollman | 341/22 |
| 2008/0167858 | A1 * | 7/2008 | Christie et al. | 704/10 |
| 2008/0189605 | A1 * | 8/2008 | Kay et al. | 715/257 |
| 2008/0189607 | A1 * | 8/2008 | Benzinger | 715/271 |
| 2008/0263443 | A1 * | 10/2008 | Maxime | 715/271 |
| 2008/0266261 | A1 * | 10/2008 | Idzik | 345/168 |
| 2010/0052877 | A1 * | 3/2010 | Mori | 340/384.5 |
| 2011/0102204 | A1 * | 5/2011 | Chen | 341/24 |

OTHER PUBLICATIONS

Kristensson et al., Relaing Stylus Typing Precision by Geometric Pattern Matching, ACM 2005, pp. 151-158.*
Rabin et al., Tactile Feedback Contributes to Consistency of Finger Movements During Typing, Google 2003, pp. 362-369.*
Peterson, a Note on Undetected Typing Errors, ACM 1986, pp. 633-637.*
Karat et al., Patterns of Entry and Correction in Large Vocabulary Continuous Speech Recognition Systems, ACM 1999, pp. 568-575.*

* cited by examiner

*Primary Examiner* — Cong-Lac Huynh
(74) *Attorney, Agent, or Firm* — Guice Patents PLLC

(57) ABSTRACT

A method for correcting typing errors according to character layout positions on a keyboard which consists of depressing responsive touch panels to do character entry to correct typing errors caused by mistakenly hitting a neighboring key of a targeted character due to a swerved typing position includes at least the steps of: (1) corresponding a character; (2) calculating a swerved amount; (3) selecting a prepared character; (4) determining whether input is finished; (5) judging rules; (6) getting the prepared character; and (7) switching the character. Through this method input accuracy can be improved and input characters can be automatically amended as desired.

9 Claims, 9 Drawing Sheets

METHOD FOR CORRECTING TYPING ERRORS ACCORDING TO CHARACTER LAYOUT POSITIONS ON A KEYBOARD

BACKGROUND OF THE INVENTION

1. Field of the Invention

The present invention relates to a method for correcting typing errors according to character layout positions on a keyboard to improve input accuracy and automatically amend characters that have been input as desired.

2. Description of the Prior Art

Advances of computer technology have a growing impact to people's life. New types of input methods have been constantly developed and introduced (such as voice input, handwriting recognition input and the like). However the input interface that can most meet human requirements still is the computer keyboard. The conventional computer keyboard is originated from the earlier typewriter. Take into account of the size of human fingers, the key has to be formed in a sufficient size to avoid the neighboring keys from being mistakenly hit when each key depressing is made. Hence trying to shrink the computer keyboard encounters practical problems. Moreover, with the computer becomes more powerful and new functions being constantly developed, the number of keys has already much greater than the traditional typewriter, and the number is still growing.

As the number of keys grows, the size of the computer keyboard also increases. Nowadays a computer keyboard with fully loaded functions could have a size covering all the usable area of an entire office desk. It occupies a great deal of space. In order to allow the fingers to reach all the keys and prevent the palms from mistakenly touching other keys, users often have to keep their two palms in the air during typing. This makes the arms and fingers easily fatigued after working for a period of time. Operation speed also slows down.

To remedy the aforesaid disadvantages, the Applicant has submitted a patent application No. 94143145 which integrates a plurality of keys operable by one finger into one key to reduce the number of keys, thus the number of keys can be reduced to shrink the keyboard. However, if the touch panel on the keys is divided into segments of too small size, the segment representing each character also is small. This causes decrease of typing accuracy, especially for the fast speed typists. On the other hand, maintaining a bigger size contradicts the objective of shrinking the keyboard. Moreover, non-professional typists often encounter a problem, namely they have to frequently lower their heads to look at the keyboard to find out or confirm the character key to be entered, and also have to raise the heads to look at the screen to confirm the correctness of the character being entered. This is especially troublesome when switching of two or more different languages is involved, such as simultaneously entering Japanese, Chinese and English. As the same key can represent English, Japanese or Chinese in different conditions, and users have to frequently lower the heads to look at the keyboard. It could happen that after the users having typed a string of characters and raise the heads to look at the screen, and find out that the entered characters are not the desired ones. Furthermore, the present computer key equipped with the newest touch panel can be greatly shrunk to carrying easier. The depressible range of each key that represents one character also decreases. The interval between the keys is not very significant. Hence the problem of mistakenly hitting the neighboring keys easily occurs. All this affects data entry speed and accuracy.

SUMMARY OF THE INVENTION

Therefore the primary object of the invention is to provide a method for correcting typing errors according to character layout positions on a keyboard that automatically amends erroneous input characters resulting from mistaken hitting a swerved zone on a key depressing segment of neighboring characters caused by hasty typing, memory failure and incidental finger swaying.

Another object of the invention is to provide a method for correcting typing errors according to character layout positions on a keyboard to prevent irregular data entry caused by aberration during execution of automatic amending function so that when a center zone of characters is hit by a user's finger the automatic amending function is suspended.

To achieve the foregoing objects the method of the invention is accomplished through one or more touch panels responsive to depressing. Each touch panel is divided into a plurality of segments. Each segment represents a character. When the touch panel is depressed by a finger, the character represented by the segment is input. The method of the invention includes at least the steps of: (1) corresponding a character; (2) calculating a swerved amount; (3) selecting a prepared character; (4) determining whether input is finished; (5) judging rules; (6) getting the prepared character; and (7) switching the character.

In one aspect the step of determining whether input is finished means that once a word ending symbol (such as space, period, comma, semicolon, pause, parenthesis) is entered, input is deemed finished.

In another aspect the step of switching the character means to mark the amended characters (including words consisting of composed characters) to alert users.

In yet another aspect the step of judging rules means to treat regular words that can be found in a dictionary as the basis of an eligible rule.

In yet another aspect the step of judging rules is based on English grammar to determine whether the grammar of word compositions in a sentence is valid.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
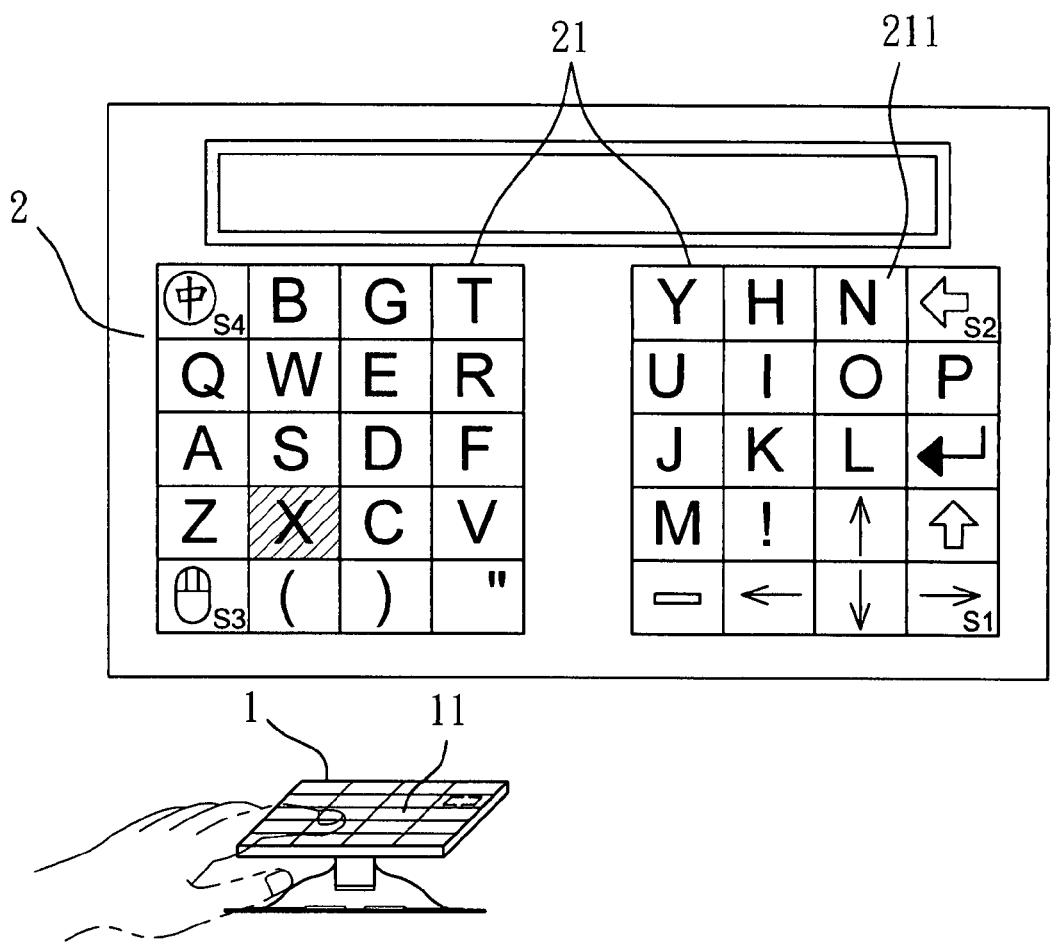
FIG. 1 is a schematic view of an embodiment of the invention.
Figure 2:
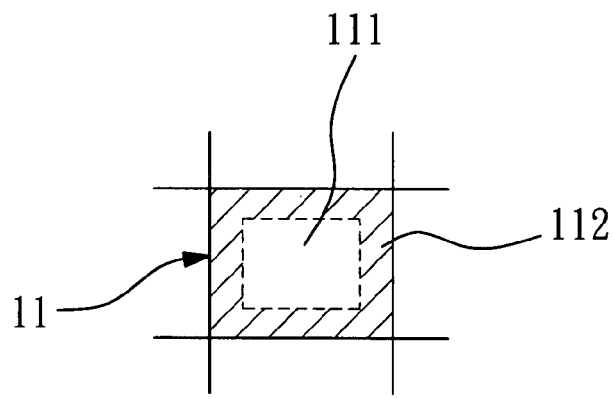
FIG. 2 is a schematic view of a swerved zone of a touch panel of the invention.
Figure 3:
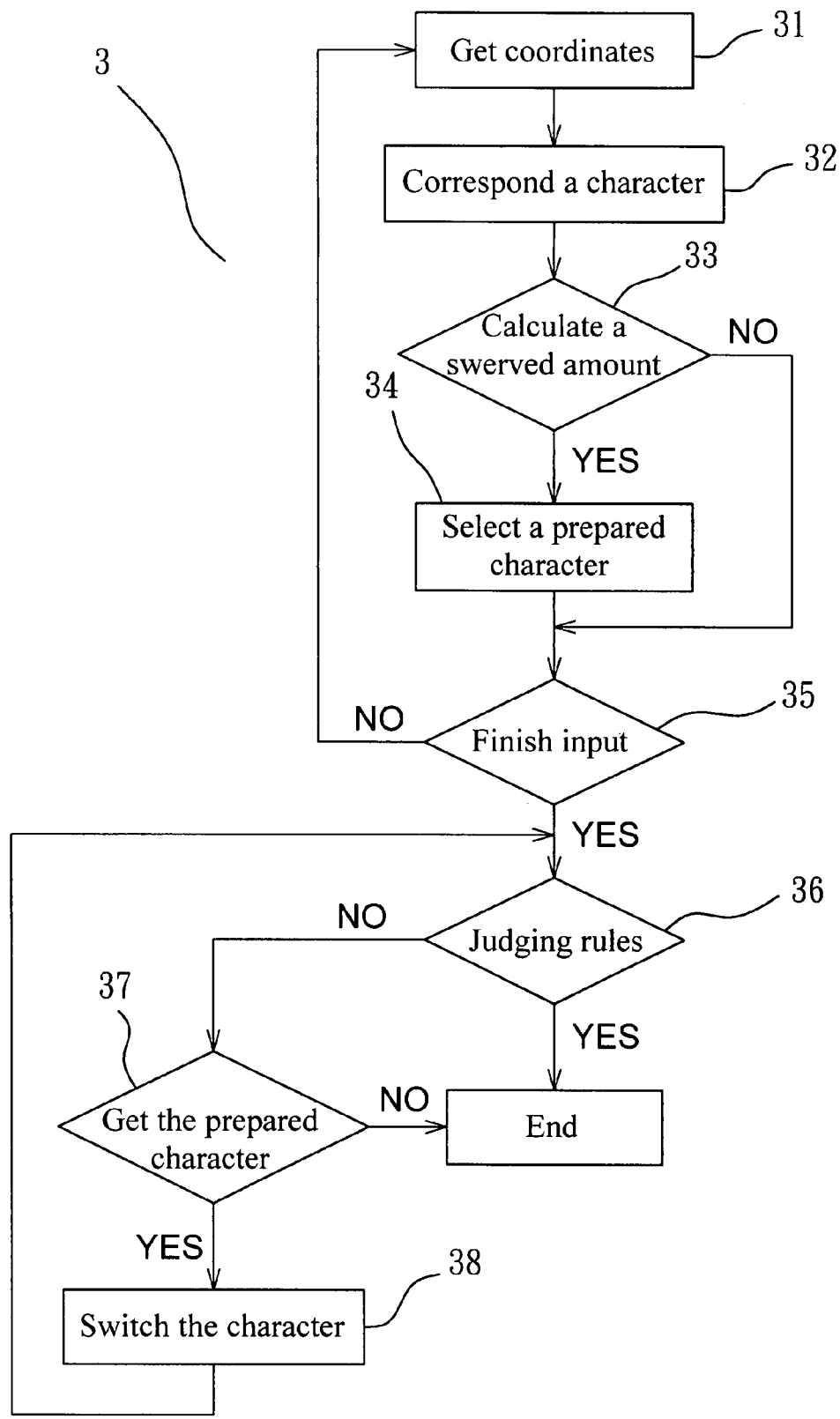
FIG. 3 is an operational flowchart of the invention.

Referring to FIG. 1, to implement the method of the invention, at least one touch panel 1 responsive to depressing is provided that is divided into a plurality of segments 11 according to coordinates to mate a keyboard table 21 displayed on a screen 2 (the keyboard table 21 has a content definition changeable by a system). Each of the segments 11 corresponds to a character 211 on the keyboard table 21. When the touch panel 1 is depressed, user's finger touches the segment 11, then the character 211 corresponding to the segment 11 is input. The segment 11 has a center zone 111 which is an effective input action zone when touched by user's finger and a swerved zone 112 (shown by a shade area with diagonal lines in FIG. 2) located on the periphery. The size of the swerved zone is set by the system. By means of the elements set forth above the method 3 of the invention can be carried out through at least the following steps (referring to FIG. 3):

1. getting coordinates (step 31): detect the coordinates of a finger touching position during depressing; namely based on the keyboard table 21 displayed on the screen 2, user's finger touches a relative segment 11 of the touch panel 1, and the coordinates of the finger touching position is obtained;

2. corresponding a character (step 32): enter the character by mapping the character coordinates with the keyboard table; get the coordinate values of the finger touching position and refer to the corresponding keyboard table 21 to get a character 211 corresponding to the coordinate value;

3. calculating a swerved amount (step 33): calculate the swerved amount between the touching position and the character center, and compare whether the swerved amount exceeds a set value; namely if the finger touching position is at the swerved zone 112, execute step 34, otherwise execute step 35;

4. selecting a prepared character (step 34): when the swerved amount exceeds the set value a neighboring character in the swerved direction is selected as a prepared character, namely if the finger touching position is located at the swerved zone 112 the neighboring character in the swerved direction is selected as the prepared character and entered in a prepared character database;

5. determining whether input is finished (step 35): judge whether input is finished; if the input character is a word ending character such as space, period, comma or the like, input is deemed finished, otherwise execute step 31;

6. judging rules (step 36): confirm whether the input character conforms to rules; namely judge whether the input character (or a word consisting of composed characters) conforms to the preset rules. The rules may be grammar, syllable combination or words available in a dictionary. Characters that conform to the rules receive an input process until finished, otherwise execute step 37;

7. getting the prepared character (step 37): search the prepared character database whether the prepared character is existed, if the outcome is negative the word or character is marked to alert the user and the input process is executed; otherwise get a new prepared character based on FIFO (First In First Out) sequence and remove the original prepared character from the prepared character database; and 8. switching the character (step 38): get the prepared character to replace the character at the original position, and mark the character (or word) which has been amended to alert the user and redo execution of step 36 until a character conforming to the rules is found to finish the input process.

Figure 4:
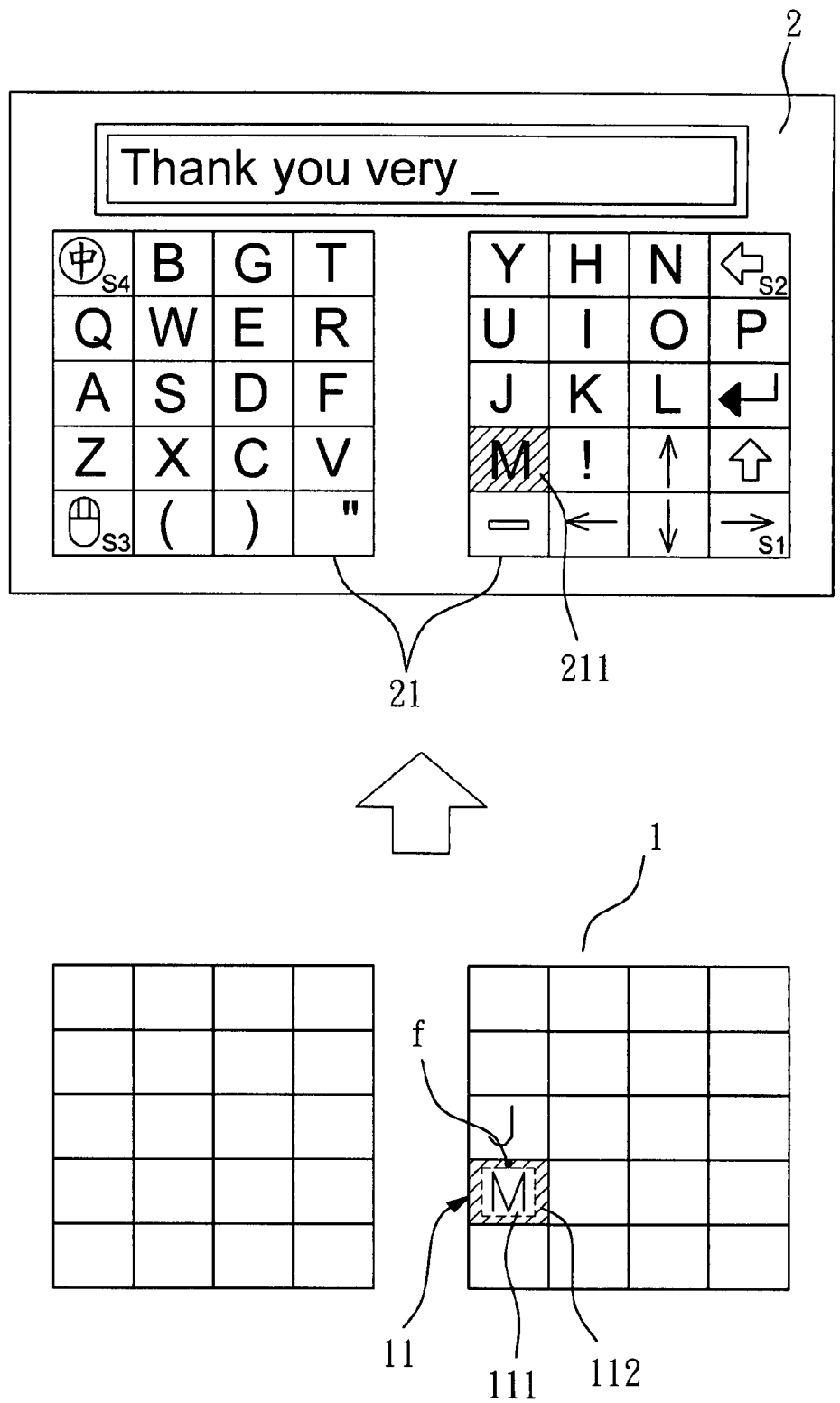
FIG. 4 is a schematic view of input operation-1 of the invention.
Figure 5:
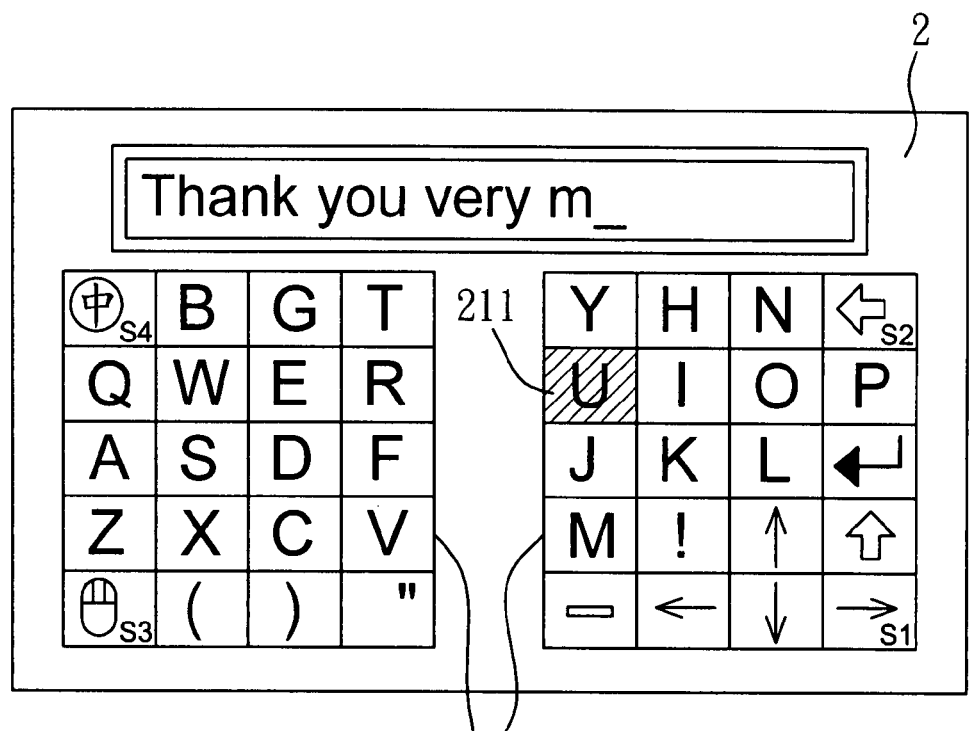
FIG. 5 is a schematic view of input operation-2 of the invention.
Figure 5:
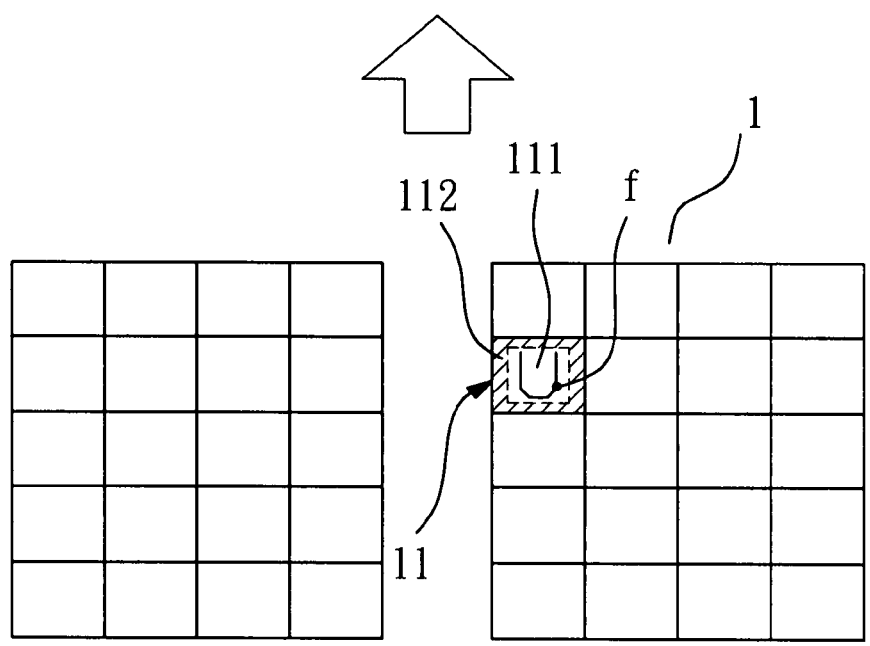
Figure 6:
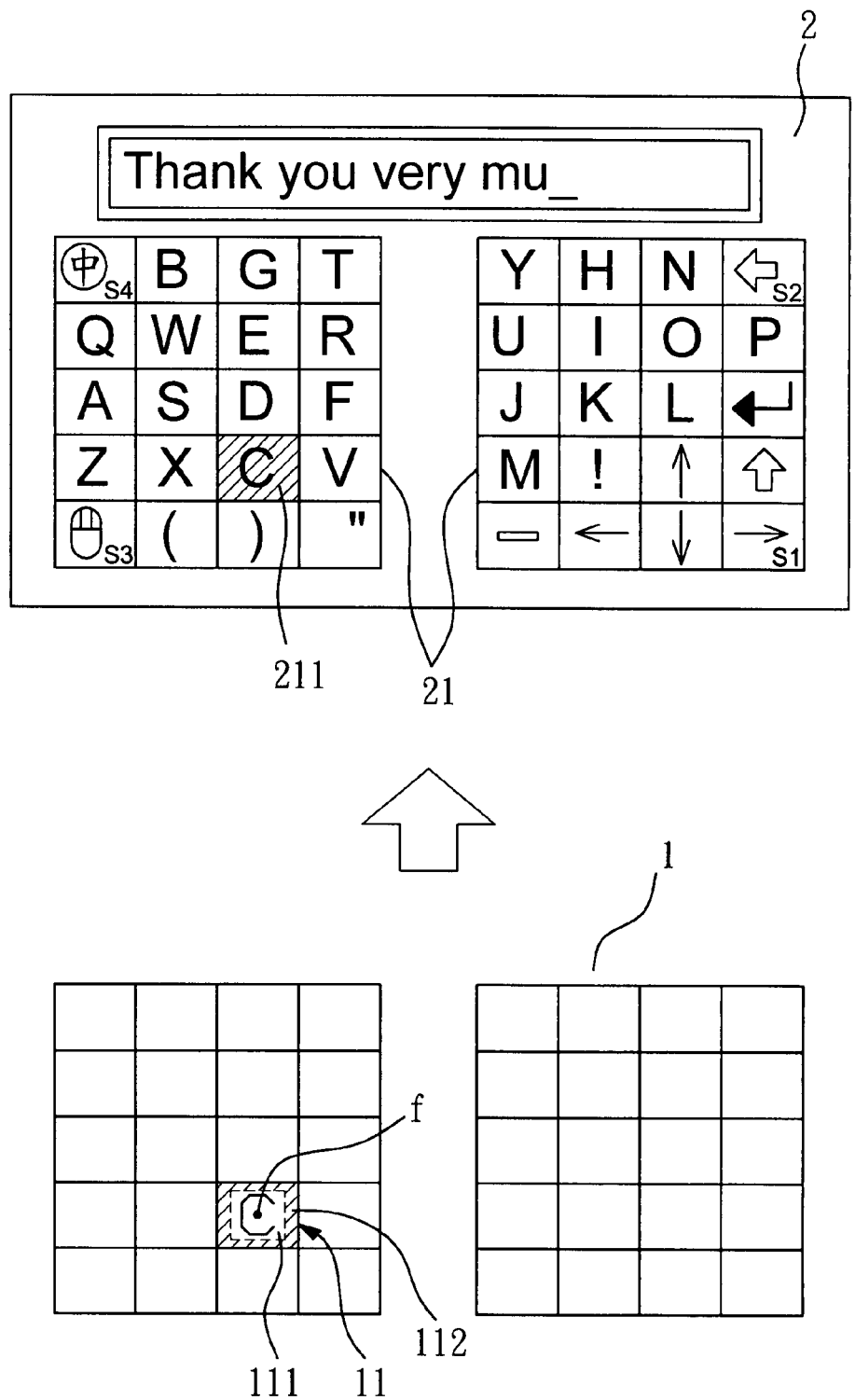
FIG. 6 is a schematic view of input operation-3 of the invention.
Figure 7:
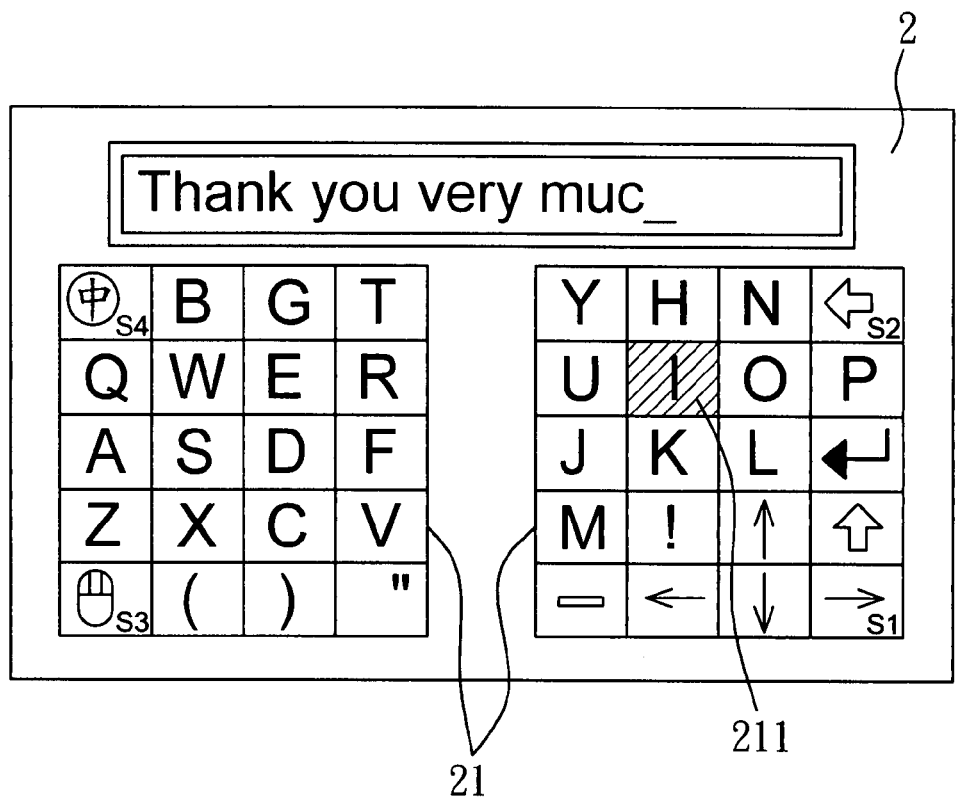
FIG. 7 is a schematic view of input operation-4 of the invention.
Figure 7:
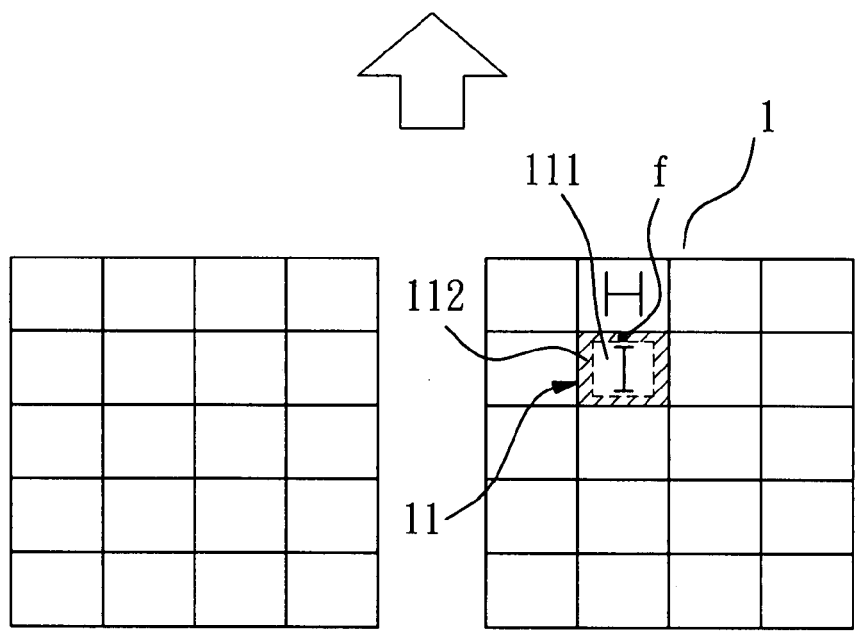
Figure 8:
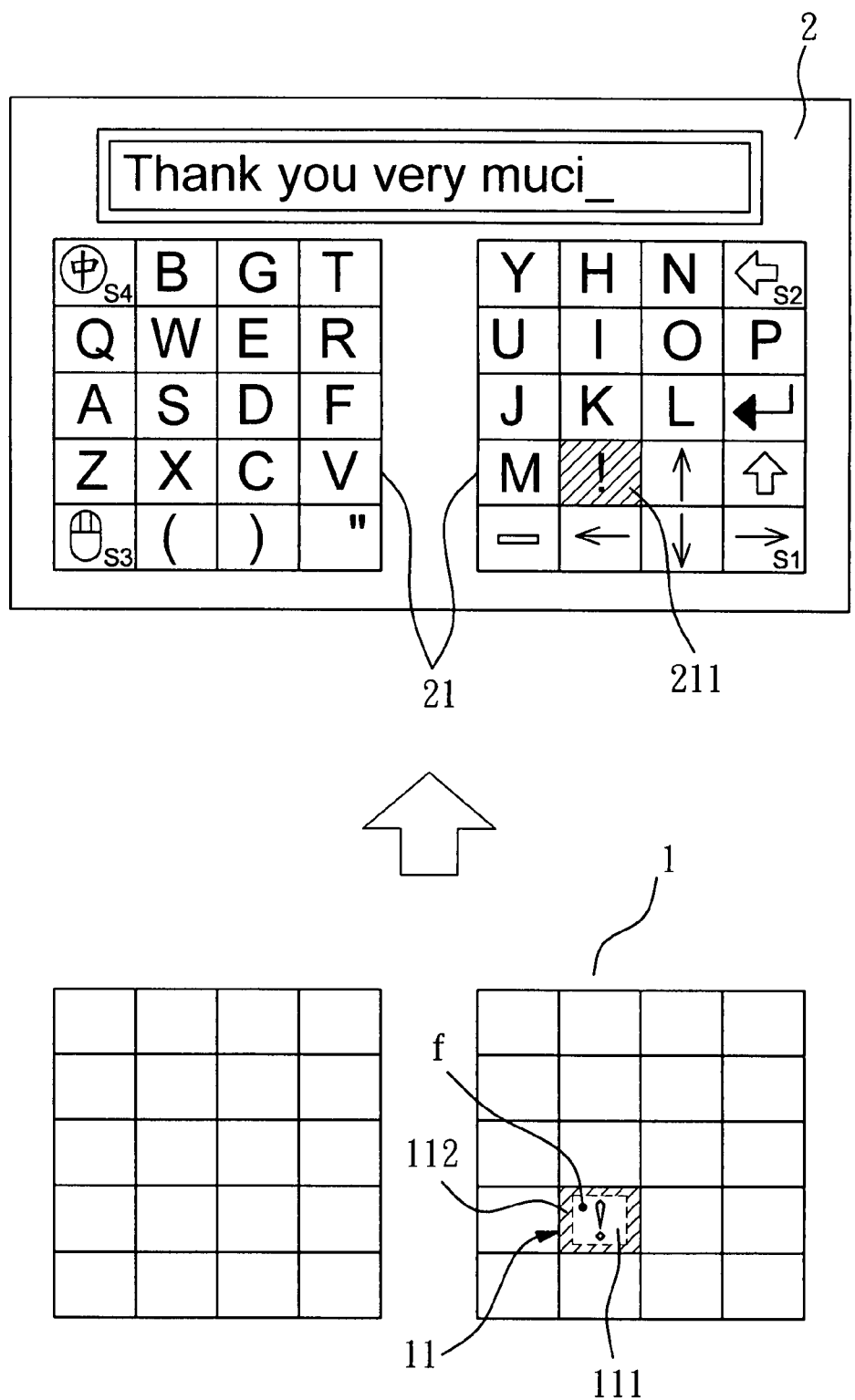
FIG. 8 is a schematic view of input operation-5 of the invention.
Figure 9:
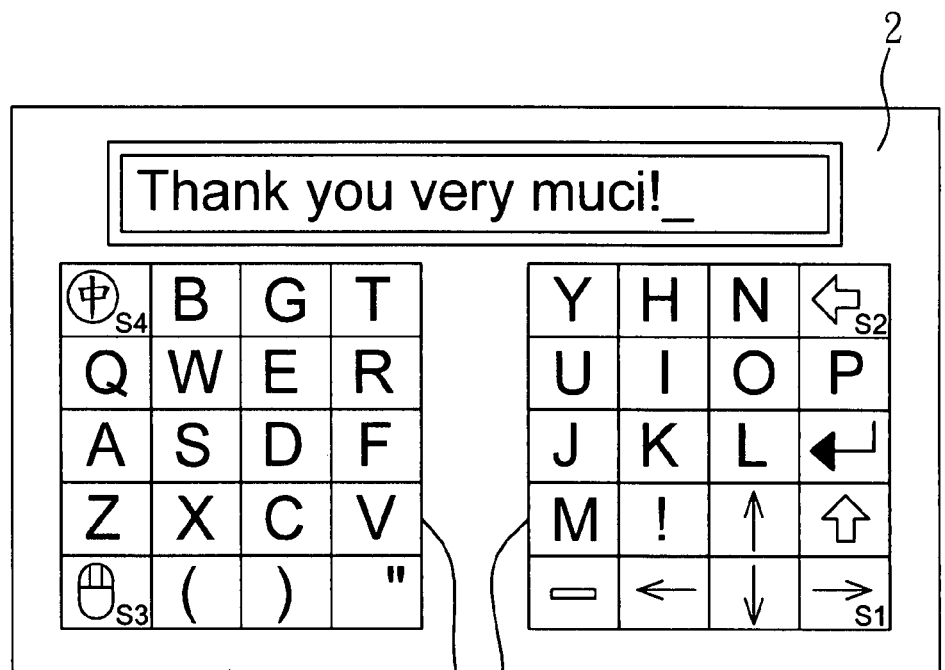
FIG. 9 is a schematic view of input operation-6 of the invention.

Through the steps of the method previously discussed, input accuracy can be enhanced. An embodiment is discussed below. For instance a sentence "Thank you very much !" is to be entered; the process is as follow:

1. Assumed that "Thank you very" have already being entered (referring to FIG. 4), and the word "much" has to be entered next. User's finger tries to depress the segment 11 representing character "m" on the touch panel 1. But the finger touching position f is at the swerved zone 112 (to facilitate discussion and understanding, in FIGS. 4-10 character symbols are added to the related segments of the touch panel to illustrate the corresponding relationship against the keyboard table 21 in a graphic manner) close to the position of a upper neighboring character "j". While the correct character "m" still is entered, but character "j" also is input into the prepared character database.

2. During entering the second character "u" (referring to FIG. 5), the finger touching position f on the touch panel 1 is at the center zone 111 of the segment 11 representing character "u", hence the character "u" is directly input without any prepared character.

3. During entering the third character "c" (referring to FIG. 6), the finger touching position f on the touch panel 1 is at the center zone 111 of the segment 11 representing character "c"; hence the character "c" also is directly input.

4. During entering the fourth character (referring to FIGS. 7 and 8), the original character to be entered is "h", but "i" is hit mistakenly, and the finger touching position f on the touch panel 1 is at the swerved zone 112 of the segment 11 representing character "i". Hence although the character "i" is entered, character "h" is selected as the prepared character and input into the prepared character database.

5. Enter the fifth character "!" (referring to FIGS. 8 and 9). The word is deemed finished (as a word ending symbol such as space, punctuation mark or the like is entered, it is deemed that input of the composed characters of the word is finished).

Figure 10:
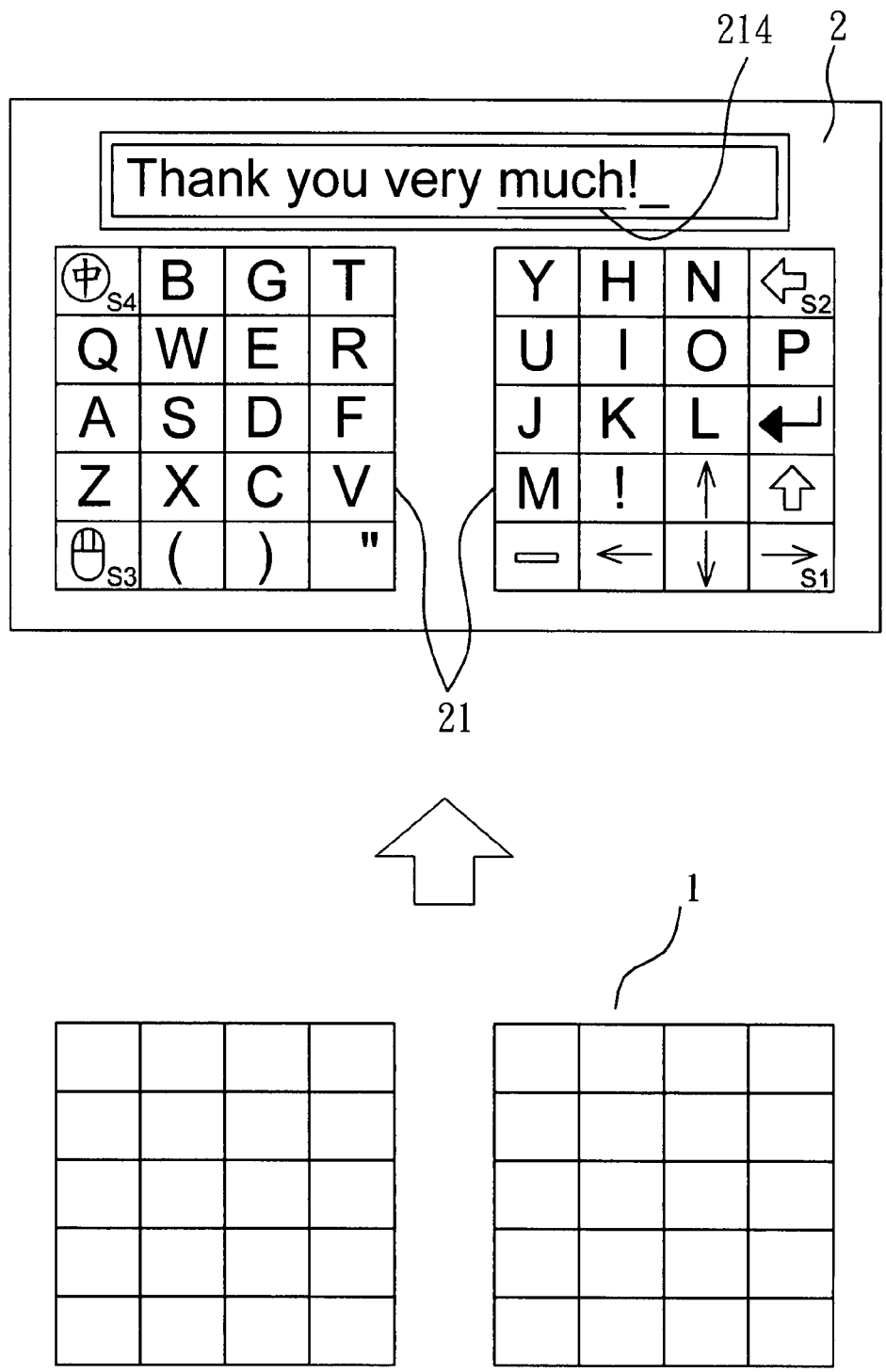
FIG. 10 is a schematic view of input operation-7 of the invention.

6. As input of the word has been finished (referring to FIGS. 9 and 10), now enter the step of judging rules. Since muci does not confirm to the rules of word composition and that word does not exist, the first prepared character "j" is retrieved to replace "m" of the same position to become 'juci'; and another judging rules process is taken, that also does not conform to the rules; hence the second prepared character "h" is retrieved to replace "i" at the same position to become "much", and yet another judging rules process is taken, that conforms to the rules. Thus "much" is taken to replace the original "muci", and the character "h" is marked as shown in FIG. 10 by 214 to alert users.

In the method of the invention set forth above, if one prepared character is taken to replace the original character and conforms to the rules (namely conforms to grammar), the replacement is accepted. If two or more prepared characters conform to the rules, one of them is accepted and a mark is made to alert the users to do review and verification.

During user's finger performs depressing action to do character entry, if the finger touching position hits the swerved zone 112 of a neighboring character (namely at the edge) and is amended after being checked through the judging rules process, it eventually expands the effective depressing range (namely the center zone 111) of each segment 11 of the touch panel 1. For instance, for a keyboard consisting of two depressing responsive touch panels each at a size of 70×70 mm, and each touch panel is divided into 20 segments (characters), the size of each segment (character) is about 17.5×14 mm. It is slightly smaller than the key of the ordinary standard keyboard. Assumed that the center zone of each segment (character) is 60%, namely at a size of 10.5×8.4 mm. If typing swerves the range a neighboring character in the swerved direction is selected as a prepared character. Namely the intended input character is the neighboring character but a targeted character is hit mistakenly. As long as the swerved extent does not reach the center zone 111 of the targeted character, amendment is still possible. As a result, the effective range of each character is eventually expanded to 24.5× 19.6 mm. It is larger than the key of the ordinary standard keyboard. Thus the users can type at a faster speed with more confidence.

I claim:

1. A method for correcting typing errors according to character layout positions on a keyboard which consists of depressing responsive touch panels to do character entry to amend the typing errors caused by mistakenly hitting a neighboring key of a targeted character due to a swerved typing position, comprising at least the steps of:
    getting coordinates of a finger touching position during depressing;
    corresponding a character by mapping the coordinates with a keyboard table to input the character;
    calculating a swerved amount between the finger touching position and the character center and comparing whether the swerved amount exceeds a set value;
    selecting a prepared character by selecting a neighboring character in a swerved direction when the swerved amount exceeds the set value;
    entering the prepared character in a prepared character database;
    determining whether the input is finished;
    judging rules being conformed to by the input character;
    getting the prepared character by searching the prepared character database and marking the character when the prepared character does not exist to finish input execution; and
    switching the character by replacing the character at an original position with the obtained prepared character and executing repeatedly the step of judging rules until a character conforming to the rules is being found to finish input process.

2. The method of claim 1, wherein the step of determining whether the input is finished is based on entering a space, a punctuation mark or a word ending symbol.

3. The method of claim 1, wherein the step of switching the character marks the amended character to alert users.

4. The method of claim 1, wherein the step of judging rules is based on a regular word findable in a dictionary.

5. The method of claim 1, wherein the step of judging rules is to check whether the grammar of word composition of a sentence conforms to English grammar.

6. The method of claim 1, wherein the step of switching the character includes marking the character which has been replaced but still does not conform to an eligible character according to the judging rules to alert users.

7. The method of claim 1, wherein the marking the character at the step of getting the prepared character includes marking the word containing said character.

8. The method of claim 1, wherein the marking the character at the step of switching the character includes marking the word containing said character.

9. The method of claim 1, wherein the step of getting the prepared character marks more than one eligible character which conforms to the judging rules to alert users.

* * * * *